Jan. 19, 1960 P. G. BURMAN 2,921,746
NOZZLE
Filed Aug. 25, 1958
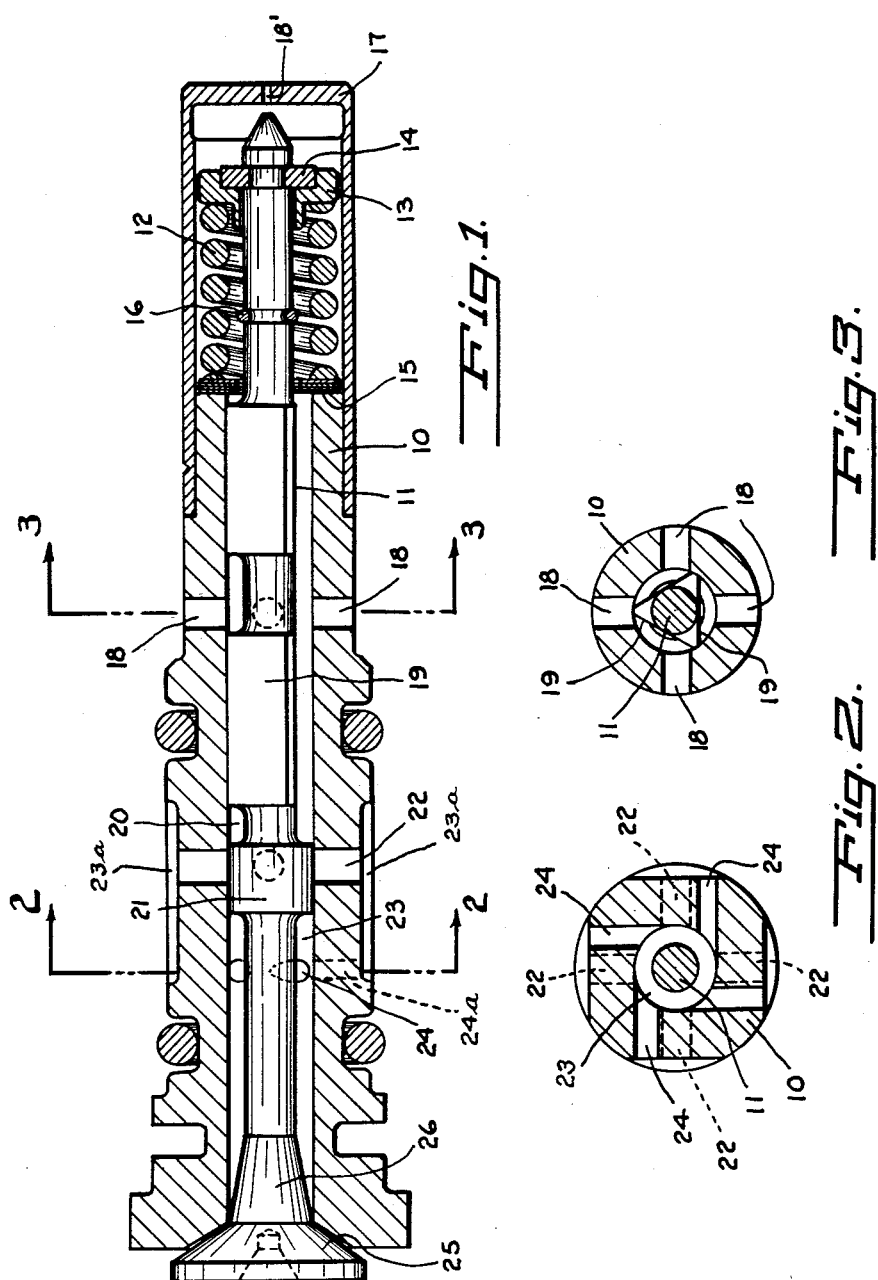
INVENTOR.
PAUL G. BURMAN
BY
Raymond A. Paquin
ATTORNEY.

2,921,746
Patented Jan. 19, 1960

2,921,746

NOZZLE

Paul G. Burman, Longmeadow, Mass., assignor to American Bosch Arma Corporation, a corporation of New York Application August 25, 1958, Serial No. 757,027

7 Claims. (Cl. 239—453)

This invention relates to improvements in the field of nozzles designed for internal combustion engines such as, for example, ram-jet engine, with particular reference to those nozzles of the poppet type.

The principal object of the invention is to provide a new and improved poppet nozzle for internal combustion engines, which nozzle contains means for producing a swirl to the fuel ahead of the poppet valve.

Another object is to provide a new and improved nozzle for internal combustion engines that contains means for overcoming streaky fuel sprays that are characteristic of nozzles at low lifts.

Another object of the invention is to provide a new and improved nozzle of the type set forth.

Other objects and advantages of the invention will be apparent from the following description taken in connection with the accompanying drawings. It will be understood that many changes may be made in the details of construction and arrangement of parts shown and described, as the preferred forms have been given by way of illustration only.

Referring to the accompanying drawings:

Fig. 1 is a longitudinal sectional view of the assembly of the aforementioned poppet type nozzle;

Fig. 2 is a sectional view of said nozzle taken on line 2—2 looking in the direction of the arrows; and Fig. 3 is a sectional view of said nozzle taken on 3—3 looking in the direction of the arrows.

Referring more particularly to the drawings wherein similar reference characters designate corresponding parts throughout, the arrangement shown in Fig. 1 comprises a nozzle body 10 containing the poppet valve 11 loaded by coil spring 12 which is retained by spring seat 13 and U washer or retainer 14. The opening pressure of said poppet valve 11 is adjusted by a series of shims 15 of desired number and size in order to precompress said coil spring 12. Snap rings 16 are provided in order to prevent said poppet valve 11 from dropping out of said nozzle body 10 in event of a failure of said coil spring 12. Said spring seat 13 is positioned in a fairly close fit within nozzle sleeve 17 in such a manner that said spring seat 13 acts as a surge damper to eliminate valve chatter. Nozzle sleeve 17 includes vent hole 18' in order to prevent stagnant fuel from being trapped and carbonizing within the head of said nozzle sleeve 17.

Radial holes 18, best shown in Fig. 3, act as fuel carriers to triangular flats 19 of nozzle valve 11. Said triangular flats 19 further act as fuel carriers to groove 20 which is adjacent to cylindrical portion 21 of nozzle valve 11. Said cylindrical portion 21 of nozzle valve 11 acts as a control by forming an overlapped covering over radial hole 22 until the fuel pressure is sufficiently high when it moves permitting said radial hole 22 to receive the fuel. Said radial hole 22 communicates with the external groove 23 from which the fuel flows to the tangential holes 24 shown in Fig. 2.

In operation, fuel enters the nozzle body 10 through the radial holes 18 and flows along the triangular flats 19 of the nozzle valve 11 to groove 20. When the fuel pressure is sufficiently high, said nozzle valve 11 starts to open so that the cylindrical land portion 21 of said nozzle valve 11 uncovers radial hole 22 communicating with the external groove 23a from which the fuel flows through port 24a to the tangential holes 24, which are shown best in Fig. 2 to bore 23. Said tangential holes 24 produce a swirl to the fuel entering ahead of the poppet 25 which is particularly desirable at low flows.

Some degree of overlap is provided by cylinder 21 over holes 22 in such a manner that the nozzle valve 11 must lift a small amount before there is any fuel flow. This is to overcome streaky sprays which are characteristic of existing poppet nozzles at very small amounts of lift.

The tapered portion 26 of the nozzle valve 11 just ahead of the poppet 25, controls the effective flow area of the nozzle valve 11 although some degree of control can be obtained by cylinder 21 uncovering holes 22.

From the above, it will be seen that I have provided a new and improved means for obtaining all of the objects and advantages of the invention.

I claim:

1. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve.

2. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve, and a tapered portion on said pintle valve adjacent said valve seat for controlling the effective flow area of the pintle valve.

3. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve, and a sleeve overlying said spring and connected to said nozzle body.

4. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve, and a tapered portion on said pintle valve adjacent said valve seat for controlling the effective flow area of the pintle valve, and a sleeve overlying said spring and connected to said nozzle body.

5. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve, said third fuel passage comprising tangential ports for producing a swirl to the fuel entering said bore.

6. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve, said third fuel passage comprising tangential ports for producing a swirl to the fuel entering said bore, and a tapered portion on said pintle valve adjacent said valve seat for controlling the effective flow area of the pintle valve.

7. In a device of the character described, a nozzle body having a bore therethrough with a valve seat surrounding one end of said bore, a pintle valve extending through said bore and having a valve portion overlying said seat for controlling the discharge of fuel, spring means connected to said pintle valve and normally retaining said valve member in engagement with said seat, said nozzle body having fuel passage means for allowing the passage of fuel to said bore, said pintle valve having spaced portions of reduced cross section with said portions being located on opposite sides of said fuel passage, a second fuel passage in said nozzle body allowing the passage of fuel from said bore externally of said nozzle body, said pintle valve having a land portion normally overlying said second fuel passage, a fuel passage externally of said nozzle body and a third fuel passage allowing the passage of fuel from said external fuel passage back to said bore in said nozzle body at a point intermediate said land and said pintle valve, said third fuel passage comprising tangential ports for producing a swirl to the fuel entering said bore, and a sleeve overlying said spring and connected to said nozzle body.

References Cited in the file of this patent

UNITED STATES PATENTS 2,452,283  Ball _____ Oct. 26, 1948